(12) United States Patent
Lang

(10) Patent No.: US 8,912,705 B2
(45) Date of Patent: Dec. 16, 2014

(54) METHOD AND APPARATUS FOR INSULATING INDUCTION MACHINE COIL CONNECTORS

(75) Inventor: Nicholas G. Lang, Cincinnati, OH (US)

(73) Assignee: Siemens Industry, Inc., Alpharetta, GA (US)

( * ) Notice: Subject to any disclaimer, the term of this patent is extended or adjusted under 35 U.S.C. 154(b) by 563 days.

(21) Appl. No.: 13/221,092

(22) Filed: Aug. 30, 2011

(65) Prior Publication Data

US 2013/0049519 A1 Feb. 28, 2013

(51) Int. Cl.
  *H02K 11/00* (2006.01)
  *H02K 3/30* (2006.01)
  *H02K 3/32* (2006.01)

(52) U.S. Cl.
  CPC ... *H02K 3/30* (2013.01); *H02K 3/32* (2013.01)

USPC .............................................. 310/260; 310/71

(58) Field of Classification Search
  USPC ....................... 310/71, 260, 43, 45
  See application file for complete search history.

(56) References Cited

U.S. PATENT DOCUMENTS

| 4,004,169 | A | * | 1/1977 | Charlton | 310/71 |
| 4,626,721 | A | * | 12/1986 | Ouchi | 310/71 |
| 4,723,083 | A | * | 2/1988 | Elton | 310/45 |
| 7,109,423 | B1 | * | 9/2006 | Bukovnik et al. | 174/77 R |
| 7,327,057 | B2 | * | 2/2008 | Ito et al. | 310/71 |

* cited by examiner

*Primary Examiner* — Dang Le

(57) ABSTRACT

Method and apparatus for insulating induction machine conductive connectors by sliding a closed-end insulating sheath over the connector. The sheath is circumferentially secured to the conductive connector with a biasing element, such as an elastomeric stretchable fabric, stretch tape or heat shrink material. Additional insulative materials as well as resin curing catalysts or accelerants may be added to the sheath.

13 Claims, 6 Drawing Sheets

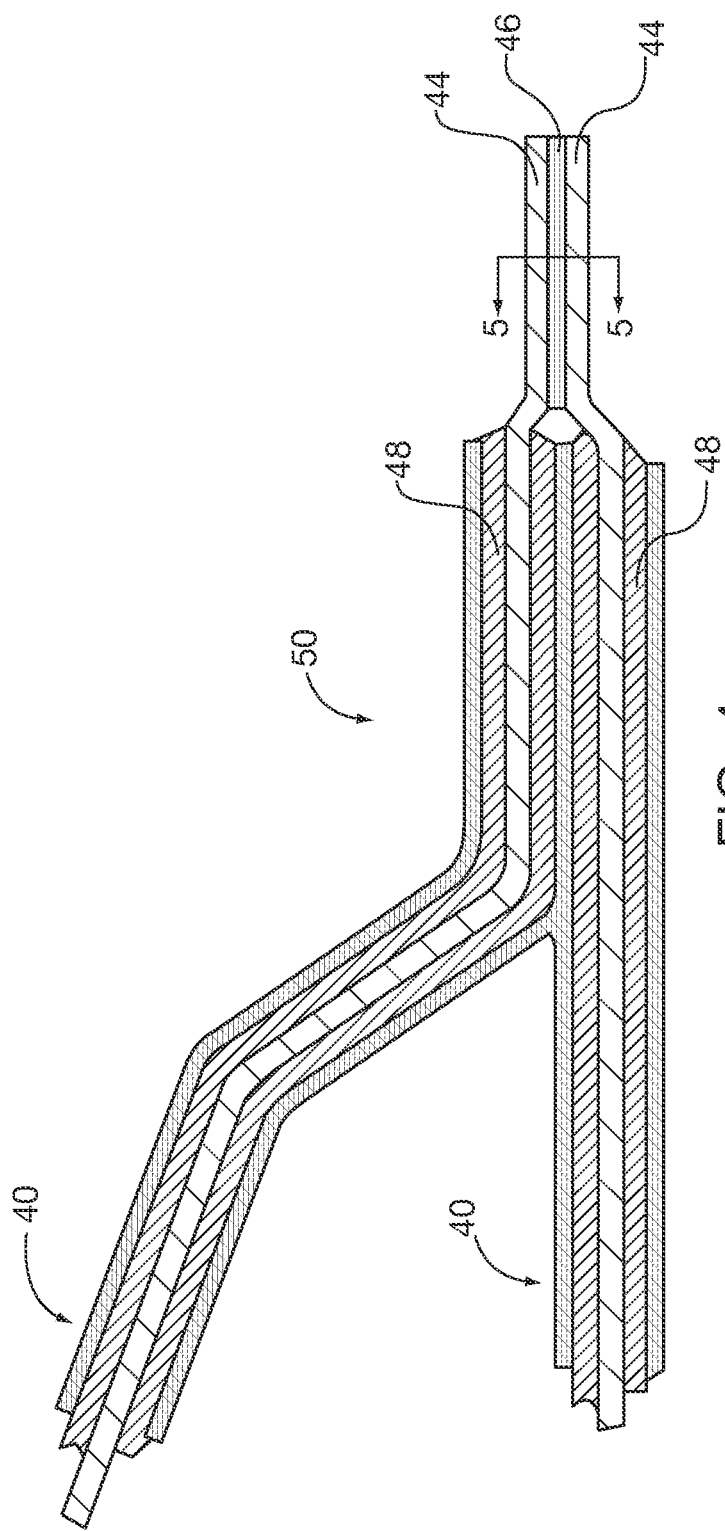
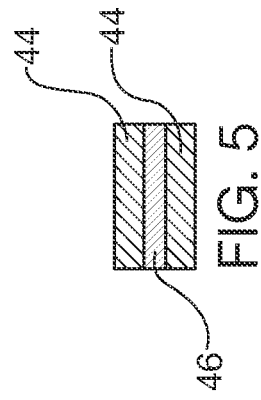

METHOD AND APPARATUS FOR INSULATING INDUCTION MACHINE COIL CONNECTORS

BACKGROUND OF THE DISCLOSURE

1. Field of the Invention

The invention relates to insulators for induction machine conductors and in particular insulators for stub connectors that provide for electrical series inter-connection between stator coils in an induction motor.

2. Description of the Prior Art

Induction machines, such as medium and high voltage motors, have stators with arrays of multiple coil windings that are electrically coupled in series about the stator circumference. Typically stub-type connectors are utilized to form the inter-coil winding series connections when the coil windings are powered with approximately 6.6 kV or less voltage.

Stub connectors are externally insulated with multiple layers of insulative materials that are hand applied serially in layers. In any particular insulating application insulative materials utilized may include: double open-ended tubular sleeves constructed of fiberglass, acrylic, silicone; tape constructed of those materials, as well as mica and armor tape; and materials embedded or coated with resin accelerators or catalysts to instigate cross-linking and curing of insulative resins that are subsequently applied to the connectors during stator fabrication. As part of the insulation application process the layers are often tightly secured circumferentially about the stub connector with elastomeric or other stretch tape or double open-ended sleeves prior to application of resin, to assure that the insulation does not separate from the connector. Another commonly used way to secure insulation to stub connectors is with shrink tubing or tape that is secured by application of heat or other energy.

Application of insulation layers serially by hand is labor intensive and time consuming. Stub connectors are located in relatively confined locations about the stator axial ends that increase difficulties in applying individual insulation layers. Hand application also introduces potential variances attributable to different individual technicians, including their skill level, efficiency and physical capabilities.

SUMMARY OF THE INVENTION

Accordingly, an object of the invention is reduce need to apply individual insulation layers to induction machine conductive connectors, such as stub connectors.

Another object of the invention is to achieve greater uniformity in application of insulation layers to induction machine conductive connectors, such as stub connectors.

These and other objects are achieved in accordance with the present invention by an induction machine insulator that includes an electrically insulating, pliable sheath that is slipped over a conductor in a manner analogous to slipping a sock over a foot or a glove on a hand. The sheath is secured to the conductor with a circumferential biasing element that is coupled to the sheath. Examples of circumferential biasing elements include elastomeric material within the sheath or externally applied over the sheath, stretch tapes, and shrink tubing/tape. The insulating sheath is prefabricated and may include addition insulation materials therein, as well as resin curing catalysts and accelerants. Prefabricated sheaths can be constructed consistently to stated specifications and are easily slipped over conductors that are located in confined spaces. Thus hand insulation application variables are reduced during induction machine fabrication.

The present invention features an induction machine insulator, comprising an electrically insulating, pliable sheath having closed lateral sides, a closed distal end, and an open proximal end, adapted for slidable insertion over and envelopment of an induction machine conductor inserted therein. A circumferential biasing element is coupled to the sheath, prior to or after insertion of the sheath over a conductor, and is adapted for securing the sheath to the conductor after insertion therein.

The present invention also features induction machines having those sheath insulators installed on conductors therein, such as stator coil windings that are series connected with stub connectors.

Another feature of the present invention is a method for insulating an induction machine conductor, comprising providing an electrically insulating, pliable sheath having closed lateral sides, a closed distal end, and an open proximal end; and also providing a circumferential biasing element, capable of being coupled to the sheath that is adapted for securing the sheath over an induction machine conductor after insertion therein. The next step is sliding the sheath over and enveloping an induction machine conductor; and thereafter securing the sheath over the induction machine conductor with the biasing element.

The objects and features of the present invention may be applied jointly or severally in any combination or sub-combination by those skilled in the art.

BRIEF DESCRIPTION OF THE DRAWINGS

The teachings of the present invention can be readily understood by considering the following detailed description in conjunction with the accompanying drawings, in which:

FIG. 4 is a cross sectional elevational view of a bare stub connector between two series connected stator coils, without insulative covering on the terminal end of the connector;

FIG. 5 is a cross sectional elevational view of the bare stub connector of FIG. 4, taken along 5-5 thereof;

To facilitate understanding, identical reference numerals have been used, where possible, to designate identical elements that are common to the figures.

DETAILED DESCRIPTION

Figure 1:
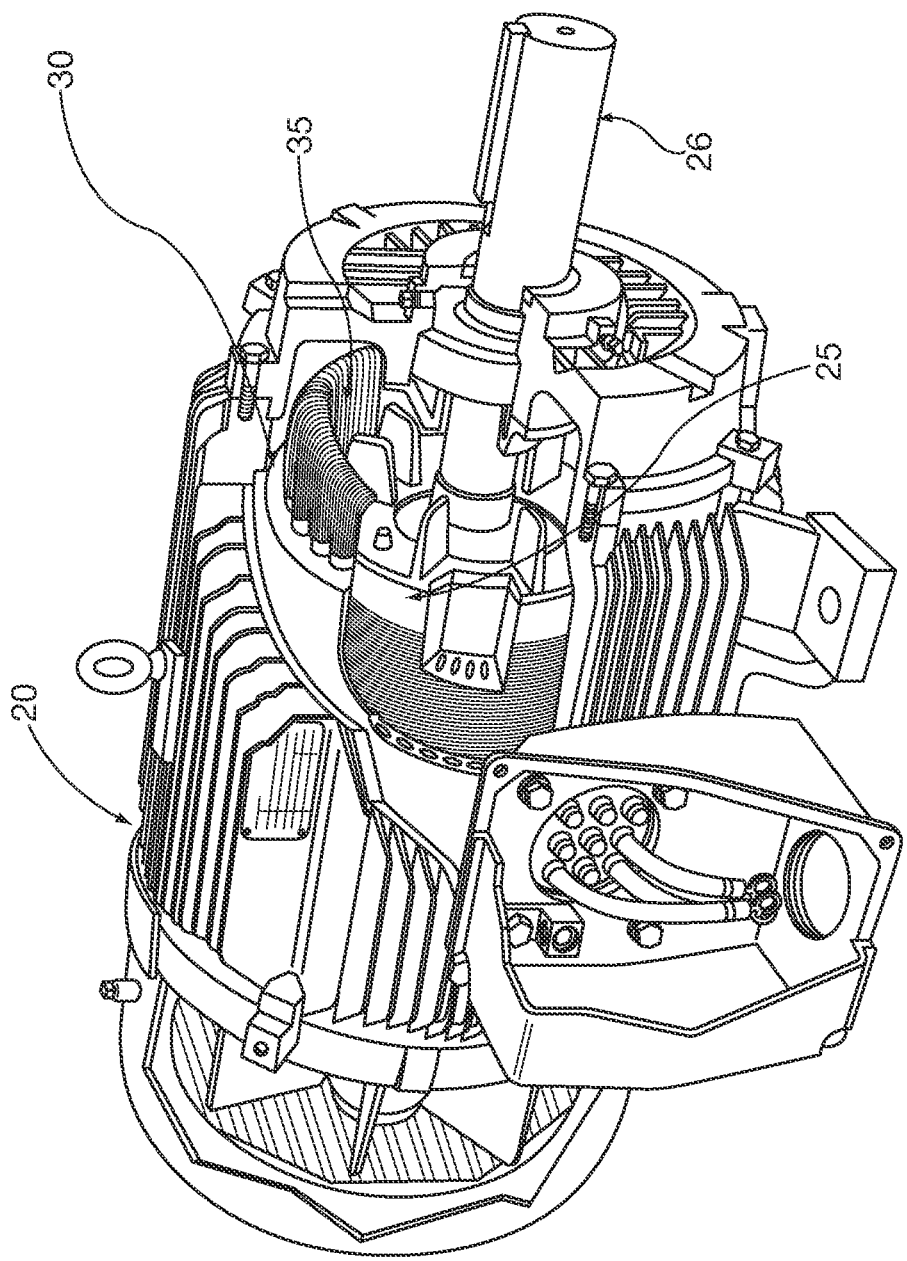
FIG. 1 is a perspective partial sectional view of an induction motor including the present invention.
Figure 2:
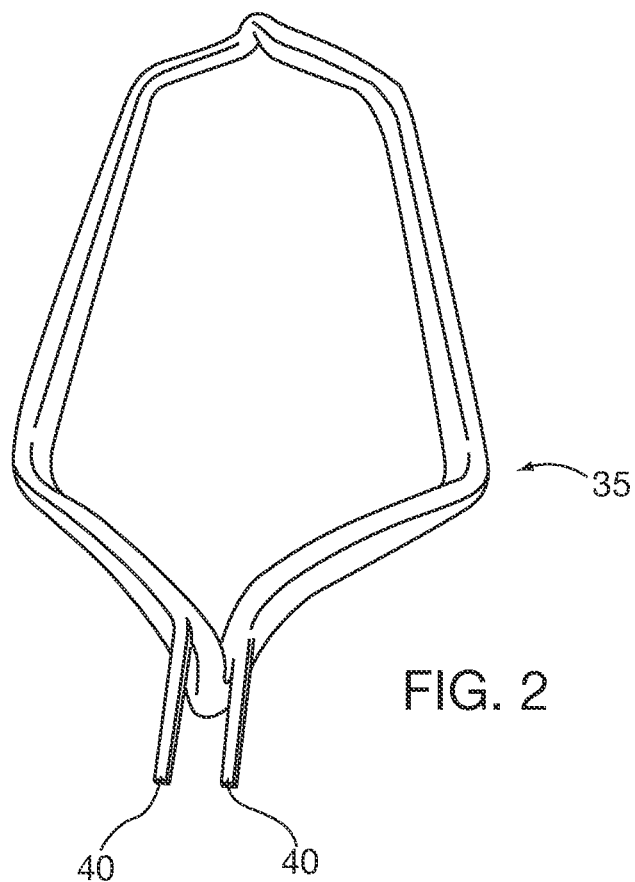
FIG. 2 is a perspective view of a stator coil of the induction motor of FIG. 1.
Figure 3:
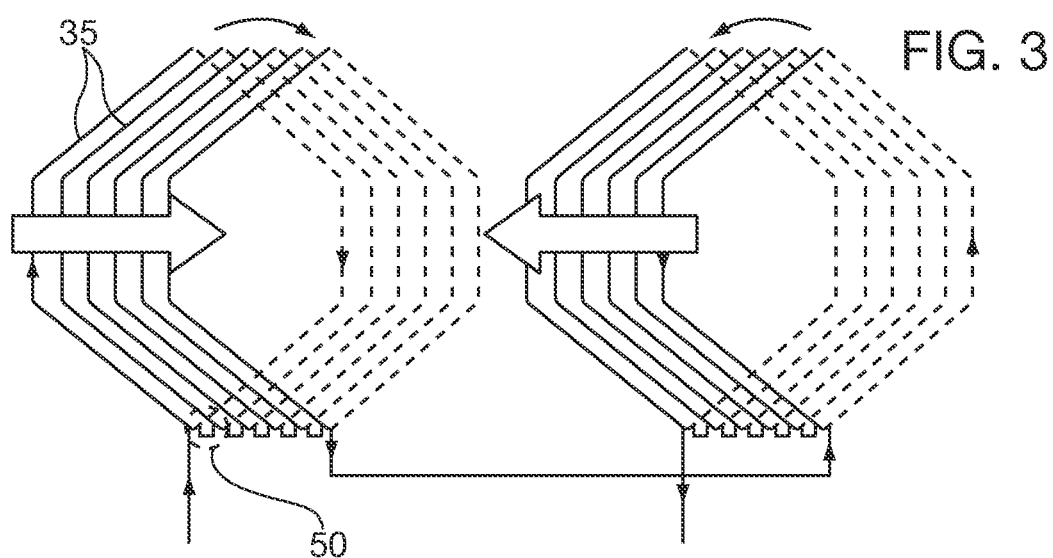
FIG. 3 is a schematic diagram of exempla series-connected stator coils in an induction motor including the present invention.
Figure 6:
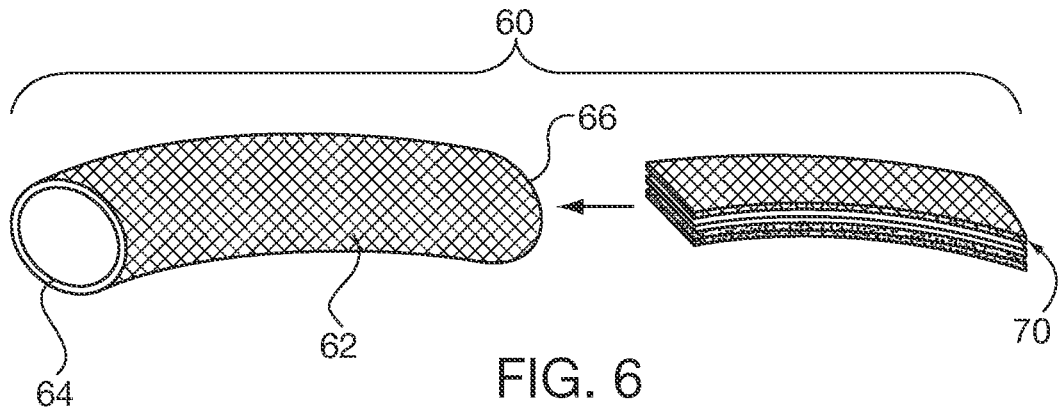
FIG. 6 is an exploded view of an insulator sheath of the present invention during its fabrication.
Figure 7:
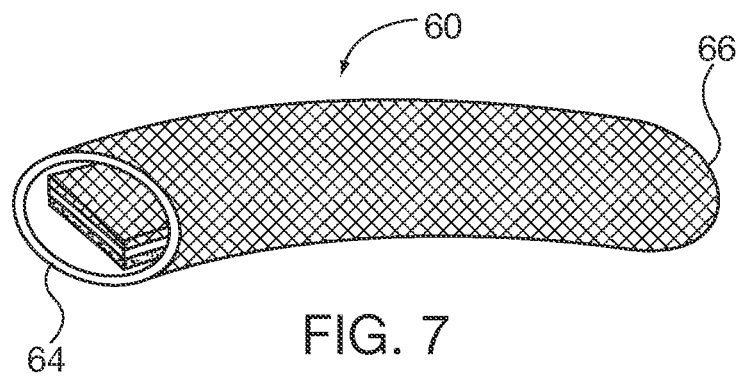
FIG. 7 is a perspective elevational view of the insulator sheath of FIG. 6 prior to completion of fabrication.
Figure 8:
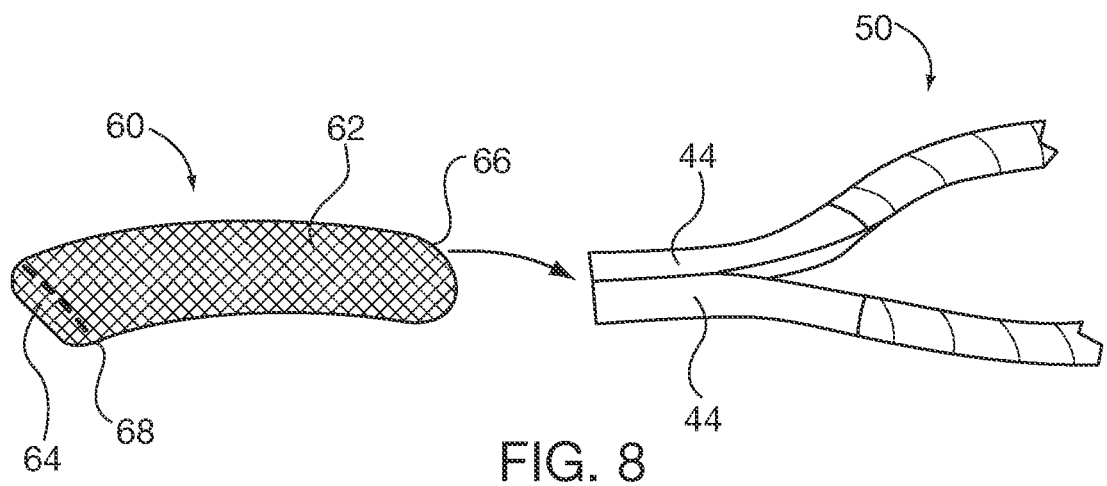
FIG. 8 is a perspective elevational view of a completed insulator sheath of the present invention before its insertion on a stator coil stub connector.

After considering the following description, those skilled in the art will clearly realize that the teachings of the present invention can be readily utilized in insulators for induction machines, such as insulators for stub connectors that interconnect stator coil windings in series within induction motors.

Application of the present invention within induction machines can be understood by skilled in the art by reference to an exemplary embodiment shown FIGS. 1-5. A known construction induction motor 20 includes a rotor 25 rotatively mounted therein on shaft 26. Stator 30 circumscribes the rotor and includes stator coils 35 each respectively having a plurality of wire windings terminating in leads 40. The individual stator coils 35 are electrically connected to each other in series so that the output lead 40 of one coil is connected to the input lead of the next coil at a stub connection 50. Referring to FIGS. 4 and 5 the stub connection 50 coil leads 40 each have a metallic electrical conductor 42, the terminal ends 44 of which are conductively joined by a brazed connection 46. Each output lead 40 is enveloped by an insulating layer 48 including one or more layers of insulating tape, up to the terminal ends 44. After the brazed connection 46 is made to complete the stub connection 50, the exposed terminal ends 44 are subsequently protected by an insulation layer during motor manufacture.

FIGS. 6-10 show fabrication of the insulator 60 of the present invention, that includes a sheath 62 constructed of a pliable insulative material with a closed distal end 64, and an open proximal end 66 that slides over stub connector 50 to cover the latter's exposed terminal ends 44. Known insulative materials may be used to construct the sheath, such as woven fiberglass or acrylics or silicone elastomers or combinations thereof. The sheath 62 may be constructed of tubular insulative woven material having the closed distal end 64 integrally formed therein, analogous to a foot stocking or glove finger tip. Alternatively, if the sheath 62 is constructed of double open-ended tubular material or flat sheet material, the sheath distal end 64 may be closed with other structural joining elements 68, such as for example a heat or ultrasonic sealing directly between the two sides of the tubular material, mechanical stitching, mechanical stapling or other mechanical fasteners such as cable ties; infiltration with a sealant bead; and adhesion with adhesives.

Additional auxiliary insulation materials 70, such as felt, mica tape, polymers or armor may be inserted into or oriented outside of the sheath 62 before or after sheath fabrication, thereby eliminating the past need to apply individual insulation layers serially to the connector 50. The insulation materials 70 may include therein known resin curing accelerators or catalysts, such as napthanate or an amine, or alternatively they may be included directly into the sheath 62.

Figure 9:
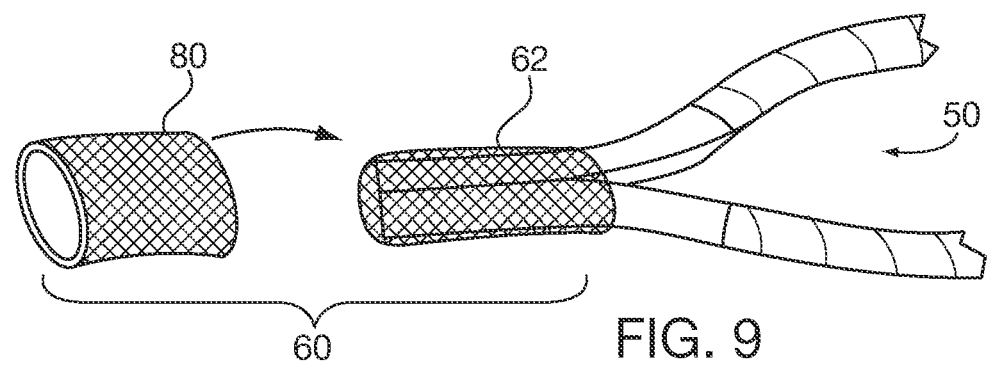
FIG. 9 is a perspective elevational view similar to that of FIG. 8, with the insulator sheath of the present invention enveloping the stator coil stub connector as a circumferential biasing element, is being applied to the sheath.
Figure 10:
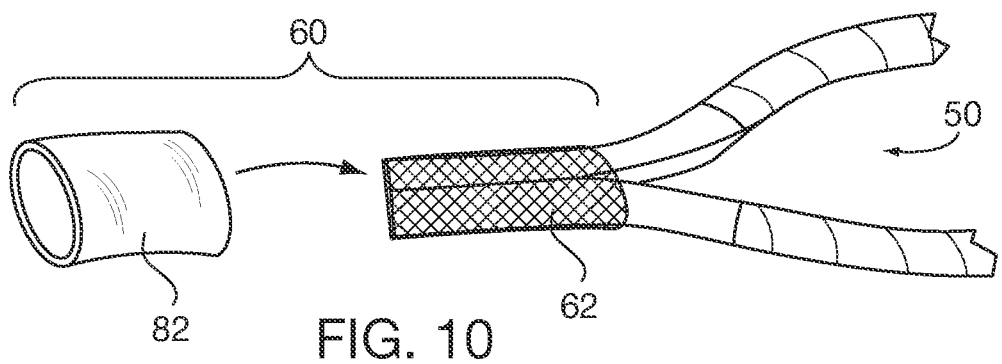
FIG. 10 is a perspective elevational view similar to that of FIG. 9, as an alternative embodiment circumferential biasing element is being applied to the sheath.

The sheath 62 may also include an elastomeric or other resilient, stretchable material integrally added to or formed within the sheath material, in order to secure it circumferentially to the connector 50, and thereby avoid inadvertent separation during subsequent manufacturing operations before application of and hardening of a known insulative resin layer. Alternatively an external biasing element layer may be applied simultaneously with sheath 62 sliding insertion over the connector 50, or thereafter. In FIG. 9 the external biasing element is an elastomer embedded and formed within tubular sleeve 80 that is applied over the sheath 62. The internal bias of the circumferentially stretching elastomer within the sleeve 80 is sufficient retain the sheath 62 on the connector 50 and avoid inadvertent separation. In FIG. 10 the biasing element is a shrink-fit tubular sleeve 82 that is applied with or after insertion of the sheath 62 over the connector 50. Alternative suitable biasing elements may include elastomeric stretchable fabric sheaths or tape; adhesive backed, elastomeric, heat shrinkable, mica, armor or polymer tape; cordage; stretchable or heat shrinkable tubes or sheaths; and cable ties. Application of and subsequent curing of a resin layer also prevents separation of the insulator 60 from the connector stub 50.

Figure 11:
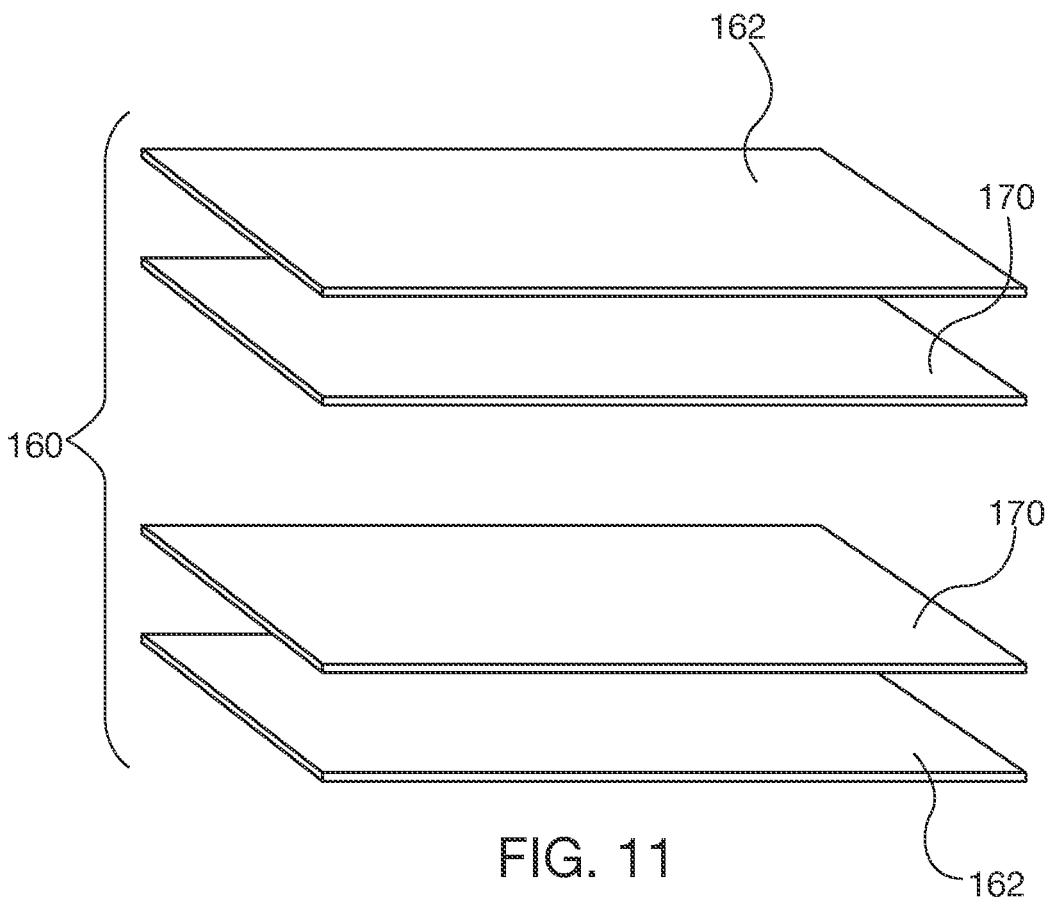
FIG. 11 is an exploded view of an alternative embodiment insulation sheath of the present invention.
Figure 12:
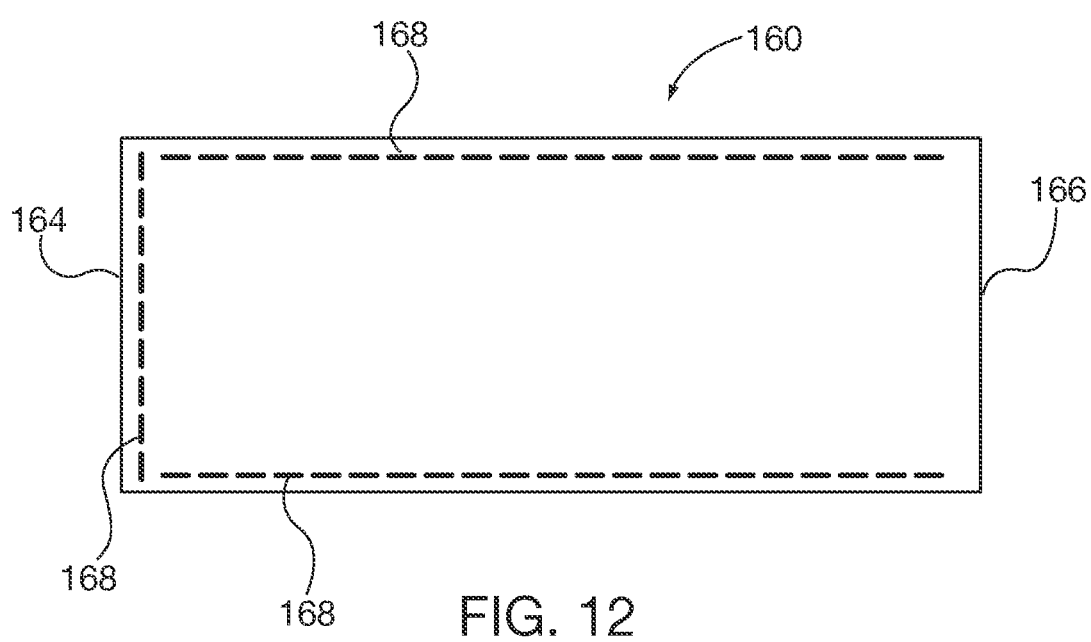
FIG. 12 is a top plan view of the assembled insulation sheath embodiment of FIG. 11.

The insulator sheath may also be fabricated from separate sheets of insulative material that are joined together, as shown in FIGS. 11 and 12. A pair of opposed layers of elastomeric stretchable fabric insulative sheets 162 form the outer layer of insulator sheath 160. Additional insulative material sheets 170 are sandwiched between or outside the insulative sheets 162. Either the insulative sheets 162 or the insulative material sheets or both may be embedded, coated or impregnated with resin curing accelerants or catalysts. The distal 164 and lateral sides of the stacked sheets 162, 170 are joined about their periphery by structural elements 166, such as by stitching, heat sealing, adhesion with adhesive, infiltration with sealant, stapling or fastening with other mechanical fasteners. The elastomeric stretchable fabric used to form the outer insulative sheets 162, or alternatively insulative material sheets 170, also provides circumferential, biasing once the completed insulator is inserted over a stub connector 50. Alternatively, the biasing element may be coupled to the insulative sheath 162 after the latter is inserted over a stub connector 50, as was done with the elastomeric sleeve 80 or shrink-wrap sleeve 82 in FIGS. 9 and 10.

Induction machine conductors, such as stator coil stub connector 50, are insulated with the insulator 60, 160 of the present invention by sliding the sheath 62, 162 over the exposed terminal ends 44 an securing the sheath over the stub connector or other conductor. If the sheath 62, 162 does not include an internal circumferential biasing element, then it is added external the sheath during or after sheath application over the terminal ends 44. The stub connector 50 and machine insulator 60, 160 may be coated with resin after their assembly, and the resin subsequently cured to complete a motor insulation layer.

Although various embodiments which incorporate the teachings of the present invention have been shown and described in detail herein, those skilled in the art can readily devise many other varied embodiments that still incorporate these teachings.

What is claimed is:

1. An induction machine insulator, comprising:
   an electrically insulating, pliable sheath having closed lateral sides, a closed distal end, and an open proximal end, adapted for slidable insertion over and envelopment of an induction machine conductor inserted therein;
   a stretchable circumferential biasing element coupled to the sheath, and adapted for securing the sheath under tension over an induction machine conductor after insertion therein; and
   auxiliary insulation coupled to the sheath and arranged inside the sheath.

2. The insulator of claim 1, wherein the sheath is tubular.

3. The insulator of claim 1, wherein the sheath distal end is closed with structural elements selected from the group consisting of integral formation within the sheath; heat or ultrasonic sealing; mechanical stitching, stapling or fastening; infiltration with sealant; and adhesion with adhesive.

4. The insulator of claim 1, wherein the circumferential biasing element is an elastomeric stretchable fabric, elastomeric stretchable tape or elastomeric stretchable coating formed within the sheath.

5. The insulator of claim 1, wherein the circumferential biasing element is an elastomeric stretchable fabric, elastomeric stretchable tape or elastomeric stretchable coating applied over the sheath circumference.

6. The insulator of claim 5, further comprising a second circumferential biasing element selected form the group consisting of elastomeric stretchable fabric sheaths or tape; adhesive backed, elastomeric, heat shrinkable, mica, armor or polymer tape; cordage; stretchable or heat shrinkable tubes or sheaths; cable ties; and curable resins, that is applied over the first circumferential biasing element.

7. The insulator of claim 1, wherein the auxiliary insulation includes resin curing accelerants or catalysts.

8. The insulator of claim 1, wherein the sheath is adapted for slidable insertion over and stretched retention around an induction motor stator coil series connector stub.

9. The insulator of claim 1 further comprising a pair of induction machine stator coils series-connected by a connector stub that is covered by said insulator.

10. The insulator of claim 9 installed along with the stator coils within an induction machine.

11. The insulator of claim 10, wherein the induction machine is an induction motor.

12. An induction motor, comprising:
a housing;
a rotor rotatively coupled within the housing;
a stator within the housing, concentrically enveloping the rotor, having a plurality of stator coils that are conductively coupled in series by stub connectors; and
a plurality of induction machine insulators covering each stub connector, each insulator respectively having:
an electrically insulating, pliable sheath having closed lateral sides, a closed distal end, and an open proximal end, slidably inserted over and enveloping the stub connector retained therein;
a stretchable circumferential biasing element coupled to the sheath, and securing the sheath under tension over the stub connector; and
auxiliary insulation coupled to the sheath and arranged inside the sheath.

13. The induction motor of claim 12, the circumferential biasing element comprising an elastomeric stretchable fabric, elastomeric stretchable tape or elastomeric stretchable coating formed within the sheath or applied over the sheath circumference.

* * * * *